No. 775,062. PATENTED NOV. 15, 1904.
J. C. CLYDE.
AIR BRAKE.
APPLICATION FILED NOV. 24, 1902.
NO MODEL. 2 SHEETS—SHEET 1.

Witnesses,

Inventor,
James C. Clyde
By Dewey Strong & Co.
Atty.

No. 775,062. PATENTED NOV. 15, 1904.
J. C. CLYDE.
AIR BRAKE.
APPLICATION FILED NOV. 24, 1902.
NO MODEL. 2 SHEETS—SHEET 2.
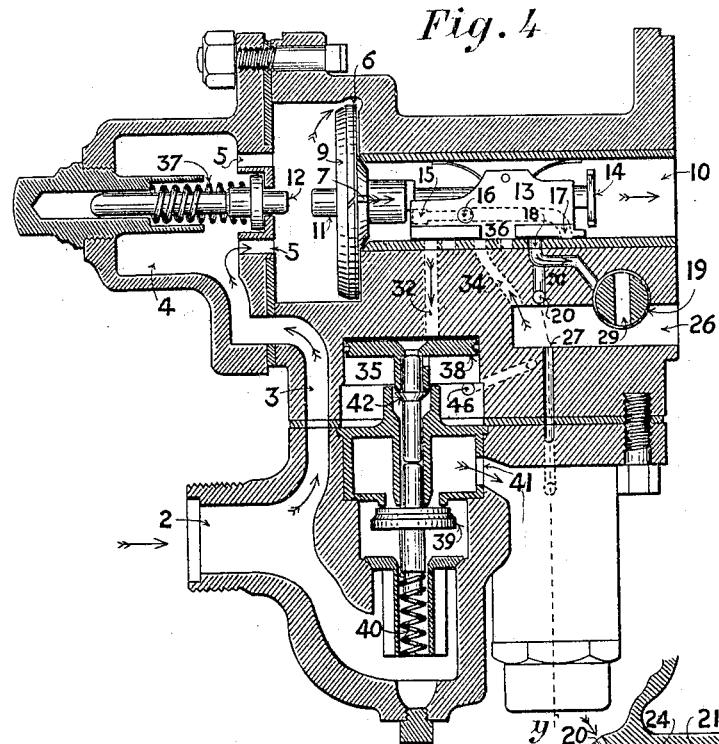
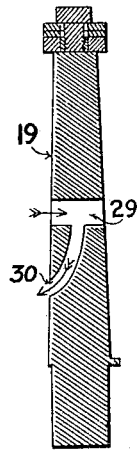
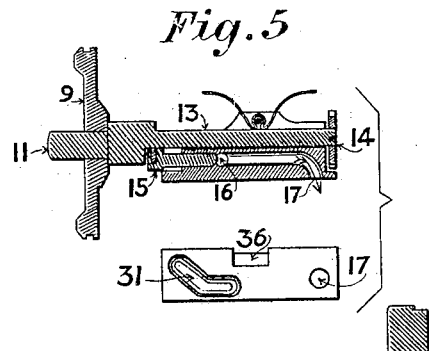
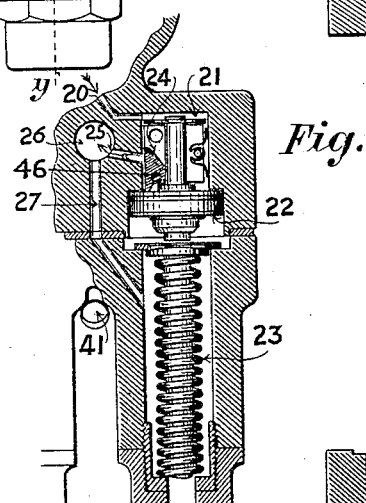
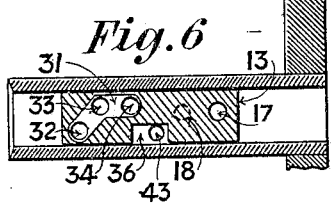
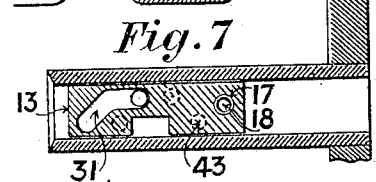

No. 775,062. Patented November 15, 1904.

UNITED STATES PATENT OFFICE.

JAMES C. CLYDE, OF SAN FRANCISCO, CALIFORNIA.

AIR-BRAKE.

SPECIFICATION forming part of Letters Patent No. 775,062, dated November 15, 1904.

Application filed November 24, 1902. Serial No. 132,625. (No model.)

*To all whom it may concern:*

Be it known that I, JAMES C. CLYDE, a citizen of the United States, residing in the city and county of San Francisco, State of California, have invented an Improvement in Air-Brakes; and I hereby declare the following to be a full, clear, and exact description of the same.

My invention relates to improvements in air-brake mechanism by which the apparatus can be more rapidly and accurately worked, the brakes applied or released, the auxiliary reservoir recharged, and a supplemental reservoir so disposed that it can be used to assist in the recharging of the auxiliary reservoir.

My invention also comprises details of construction, which will be more fully explained by reference to the accompanying drawings, in which—

Figure 1:
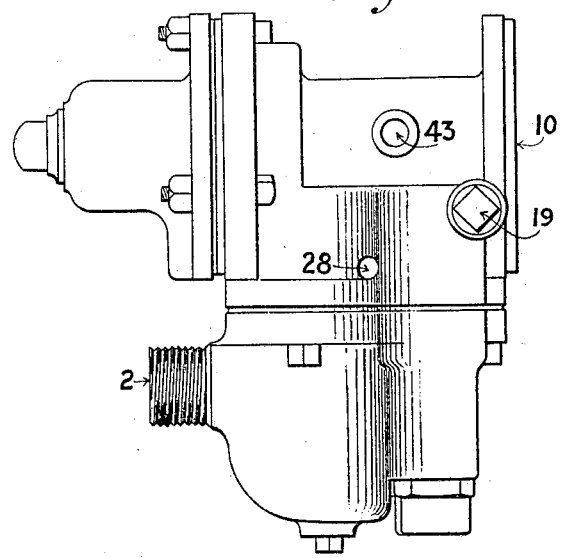
Figure 2:
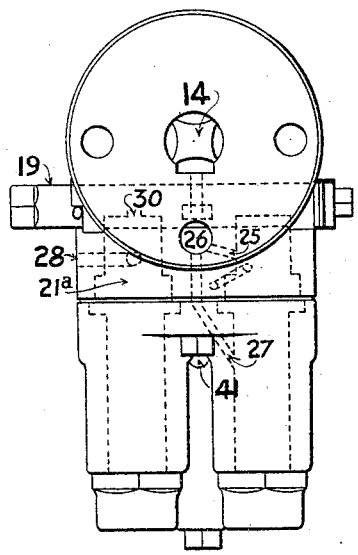
Figure 3:
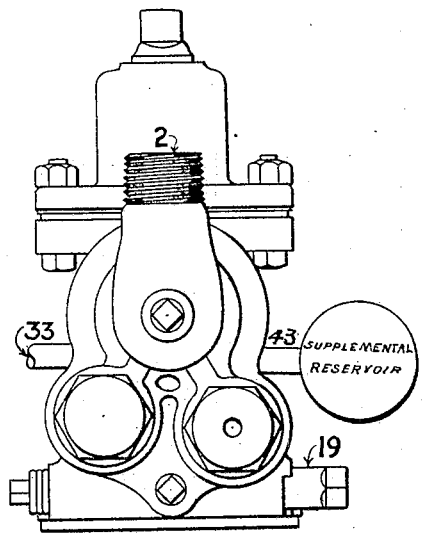

Figure 1 is a side elevation of air-brake. Fig. 2 is an end elevation showing in dotted lines the relative positions of the two piston-chambers 21 and 21ª. Fig. 3 shows relative position of the two piston-chambers in place. Fig. 4 is a longitudinal section of air-brake through the center. Fig. 5 is a longitudinal section and under side of slide-valve 13. Figs. 6 and 7 show the two positions of slide-valve 13 on slide-valve seat. Fig. 8 is a transverse section of piston-chamber 21 through line *x y*, Fig. 4, looking to the left. Fig. 9 is a sectional view of plug-cock.

As shown in Fig. 4, the passage 2 connects directly with the train-pipe, and passage 10 at the upper opposite side connects with the auxiliary reservoir.

The objects of the invention are to control the pressure from the auxiliary reservoir to the brake-cylinder, to rapidly charge the auxiliary reservoir and to let the train-line pressure escape to the atmosphere instead of to the brake-cylinder, and to make quick emergency stops.

Only so much of the apparatus is here shown as is necessary to explain its connection. The same general arrangement of brake-cylinder, piston, and slide-valve 13 is preserved as is in use upon the Westinghouse air-brake; but the slide-valve seat has five ports instead of three. The train air-pressure enters at the left and bottom of Fig. 4 at 2 and passes through passage 3 4, openings 5, passage around 6 7 in piston 9, thence through passage 10 to the auxiliary reservoir until said reservoir is charged to the train-line pressure. The reservoir being thus filled, the brakes being off, a small reduction of, say, five or eight pounds being made in the train-line pressure, the superior pressure from the auxiliary reservoir moves the piston 9 away from its seat until its periphery cuts off the port or passage 6 and closes it, the stem 11 and valve 13 being moved with the movement of the piston. The opposite end of the stem marked 14 is slidable through the valve 13 and moves a short distance in unison with the movement of the piston 9 before the head of this stem contacts with the valve and commences to move the valve. This movement of the stem carries with it the valve 15 and opens the port 16. (Shown in Fig. 5.) The subsequent movement of the valve 13 brings the port 17 (shown in Fig. 6) into line with the port 18 in the valve-seat. The movement of the valve 13 is arrested by contact of the stem 11 with stem 12, which is prevented from moving by the spring 37, except for emergency applications, hereinafter described. Air passes through the port 16 from the auxiliary reservoir through the ports 17 and 18, now in unison, and to the plug-cock 19, which, as shown in Fig. 4, is closed to any further passage of the air in that direction. Air passing through the port 18 also passes through a port 20, which conducts it to the chamber 21, in which the piston 22 is movable, as shown in Fig. 8. The air thus admitted presses the piston 22 down against the tension of the spring 23 in the lower part of the chamber, which tension may amount to, say, forty pounds. This movement of the piston and connected parts moves the slide-valve 24 and uncovers the port 25, Fig. 8, which leads to the chamber 26, (shown in Figs. 4 and 8,) which is at all times in communication with the brake-cylinder. Thence the air is allowed to pass through the passage 27 to the chamber containing the spring 23, below the piston 22, until the added air-pressure in the spring-chamber, which may amount to twenty pounds, and in addition to the tension of the spring give a pressure of sixty pounds. This will be sufficient to move the piston 22 back again and close the port 25.

When the above operation is taking place, air also passes through a small port 46 into the space beneath the emergency-piston sufficiently to prevent an emergency application when only an ordinary application is required. This port 46 is, however, so much smaller than the port 32, through which air is admitted above the piston 38 for emergency applications, that the more rapid flow of air through port 32 will move the piston to make said application when desired before the pressure above the piston can be balanced by the air entering below it through the port 46.

The emergency application will be fully described hereinafter.

The tendency of the air from auxiliary reservoir to the brake-cylinder through passage 26 would be to equalize the pressure in the two; but the tension of the spring 23 instantly closes communication through passage 25, and thus leaves a surplus air-pressure in 27 equal to that of the spring 23—say, forty pounds.

Should there be a leak from the brake-cylinder, it would allow air to also escape from the spring-chamber until the superior pressure from the auxiliary reservoir would again push the piston 22 down against tension of spring 23 and again momentarily open port 25 and recharge the brake-cylinder through the chamber 26. The superior pressure in the auxiliary reservoir over that of the brake-cylinder would thus allow the latter to be recharged several times without recharging the auxiliary reservoir, and the brakes would be kept up to their normal pressure by this automatic action.

If the pressure in the brake-cylinder is too great and liable to cause the wheels to slide by too forcible application of the brakes, it is necessary to reduce this pressure. It is done by means of a second piston-valve and spring similar to those shown at 22, 24, and 23 and a port 28 shown in Figs. 1 and 2 similar to 25, but opening directly to the exterior air. The relative positions of the two piston-chambers are indicated in dotted lines in Fig. 2, and the exact construction of both is well shown in Fig. 8. The spring in this second piston-chamber has a tension equal to the desired pressure in the brake-cylinder which is less than sufficient to cause the wheels to slide with the lightest load that the car may carry. This pressure may be, say, twenty pounds. In this case there is no air connection with the spring-chamber; but the air which may be admitted to the piston-chamber will overcome the spring-pressure whenever the brake-cylinder pressure is too great, and this moves the valve corresponding to 24 and allows the excess pressure to escape through the passage 28. When this pressure is sufficiently reduced, the spring again closes the escape-port valve, and the proper pressure is retained in the chamber 26 and the brake-cylinder with which said chamber connects. The turnable plug 19 has a slot 29 made transversely through it, and a passage 30 connects with this slot and leads off to one side, as shown in Fig. 9. When the plug is in the position shown in Fig. 4, the slot 29 has no communication with the passage 18; but the port 30, extending from the slot 29, forms an open communication between chamber 26 and the brake-cylinder with the chamber 21ª of the second cylinder. (Indicated in Fig. 2.)

As previously described, the brake-cylinder pressure is designed for light or empty cars; but when the cars are loaded the plug 19 is turned until the slot 29 communicates with the port or passage 18, Fig. 4, and the port 30 is turned out of line. In this position air is admitted from the auxiliary reservoir through the port 18, slot 29 in the plug, and through passage 20 to equalize the brake-cylinder pressure and increase it to suit the heavier load.

When the brakes are to be released, the previously-reduced pressure in the train-pipe is restored and the auxiliary reservoir is recharged. This action moves the piston 9 and the valve 13 back to its first position, and this movement carries the port 17 out of line with the port 18 and brings the angular recess 31, which is shown in the valve-face in Figs. 6 and 7, into position to cover ports 32, 33, and 34. (Shown in Fig. 6.) This opens communication with the open air from port 33, from the brake-cylinder by port 34, and from the emergency-cylinder 35 by port 32.

For an emergency application a quick reduction of the train-pipe pressure allows the piston 9 to be moved the full extent of its stroke by pressure from the auxiliary reservoir. The end 11 of the piston-stem then contacts with the piston 12, pushing it back against the tension of spring 37, so that the valve 13 is moved far enough to bring the open channel 36 of said valve into communication with the port 32 and through it with the emergency cylinder 35, as shown in Fig. 4. Pressure from the auxiliary reservoir passes through the port 32 of the emergency-chamber, forcing the piston 38 downward and closing the stem-valve 42 upon its seat and opening the emergency-valve 39 by forcing it away from its seat. This action opens a large passage to the atmosphere through the port 41, (shown in Fig. 4,) thus allowing the rapid reduction of train-pipe air-pressure through this large port in each triple valve in the train, thus applying the brakes with full force to each car so quickly that the sudden shock is prevented by the rapid reduction of the train-line pressure on each car of the train. Restoration of the train-pipe pressure assists the spring 40, and thus closes the valve 39, and the valve 13 is again returned to the right end of its stroke and releases the brake. The extreme movement of valve 13 to the left, as above described, also uncovers port 18 and allows open connection between auxiliary reservoir and the brake-cylinder. The stem of piston 38 carries a valve, as shown at 42, Fig. 4, which is closable against a corresponding seat when the piston 38 is forced down, and thus prevents leakage around the stem.

The operation of recharging the auxiliary reservoir usually takes some seconds; but in order to make this operation more rapid I employ a suitable storage-reservoir, not here shown, but which has a passage 43, (shown plainly in Fig. 6,) which connects with the transverse opening 36 of the valve 13, so that when the valve 13 is in position to recharge the auxiliary reservoir the channel 36 is in line with the passage 43, and the storage-reservoir will be fully charged at the same time with the auxiliary reservoir. The port 43 is closed by the forward movement of the valve 13, and the charge is retained in the storage-reservoir; but if the pressure in the auxiliary reservoir becomes reduced and it is desirable to have it instantly brought up to required pressure it can be recharged from the storage-reservoir by bringing the passage 36 with the valve 13 into line with the passage 43, thus considerably reducing the time which is ordinarily consumed in charging the auxiliary reservoir in the usual manner through feed-port 6 around valve 9.

Having thus described my invention, what I claim, and desire to secure by Letters Patent, is—

1. The combination in an air-brake mechanism of a piston-valve, a chamber within which it is movable, an open connection between the train air-pipe and said chamber, a second chamber upon the opposite side of the piston, a slide-valve movable in said chamber, a stem extending from the piston-valve loosely through the slide-valve having a head upon its outer end whereby the piston-valve is first moved by reduction of train-pipe pressure and the slide-valve is subsequently moved by contact of the piston-rod head, ports through said slide-valve, a valve movable in unison with the piston-valve stem and acting by its movement to open the port in the slide-valve, a second piston-valve movable in a chamber and carrying a second slide-valve, connections with said piston-chamber controlled by the movement of the previously-named valves whereby air is admitted thereto and communication opened between said chamber and the brake-cylinder.

2. The combination in an air-brake mechanism of a piston-valve, a chamber in open communication with the train air-pipe and within which the piston-valve is movable, an independent slide-valve movable in a chamber upon the opposite side of the piston and having ports therein, a stem extending from the piston-valve loosely through the slide-valve having a head upon its end whereby the piston-valve is first moved by reduction of train-pipe pressure to close communication with the auxiliary reservoir and the slide-valve is subsequently moved to open communication therethrough, a second piston movable in a cylinder by the air-pressure admitted through the slide-valve, a slide-valve carried by the said second piston, communication opened thereby between the auxiliary reservoir and the brake-cylinder, a spring acting to close the piston and slide-valve and having less pressure than that of the air which is admitted to open the valve, a passage connecting the exterior chamber and brake-cylinder with the spring-chamber whereby the air-pressure is equalized and the spring enabled to close communication with the brake-cylinder.

3. The combination in an air-brake mechanism of a piston-valve movable in a chamber intermediate between the train air-pipe and the auxiliary reservoir, a slide-valve connected with and movable by said piston when train-pressure is reduced, ports opened by said movement to admit air to the brake-cylinder, a second piston movable in a cylinder, a valve movable in unison therewith whereby air is admitted from the auxiliary reservoir to the chamber connecting with the cylinder, a spring acting against the piston having pressure less than that of the air, a passage connecting the chamber and brake-cylinder with the spring-chamber whereby a portion of the air-pressure is admitted to augment the spring-pressure and return the piston and close the valve whereby the surplus air-pressure remains in the spring-chamber in open communication with the brake-cylinder so that leakage from said cylinder will reduce the pressure and allow a superior pressure from the auxiliary reservoir to again open the valves and recharge the brake-cylinder.

4. The combination in an air-brake mechanism of a piston-valve movable in a chamber intermediate between the train air-pipe and the auxiliary reservoir, a slide-valve connected with and movable by said piston when train-pressure is reduced, ports opened by said movement to admit air to the brake-cylinder, a plug-valve having a transverse main 29 and diagonal supplemental passage 30 opening therefrom, a piston-chamber with which said supplemental passage is brought into open communication, a piston and a valve carried thereby movable in said chamber, and a passage 28 open to the air and exposed by the movement of the valve.

5. The combination in an air-brake mechanism of a piston 22, a chamber intermediate between the train air-pipe and the auxiliary reservoir in which the piston is reciprocable, a slide-valve 24 connected with and movable by said piston when train-pressure is reduced, ports opened by said movement to admit air to the brake-cylinder, a cylinder having a piston 38, valves 42 and 39 with stems axially in line with and actuated by the movement of the piston, ports controlled by valve 13 and opened by a quick reduction of train-pipe pressure to move the piston and valves, and open communication between the train-pipe and the outer air, and an independent valve 19 by which the emergency and brake-cylinder pressure is proportioned to the weight of the cars.

6. An air-brake mechanism comprising a piston-valve; a chamber within which it is movable; connections between the train air-pipe and said chamber; a slide-valve 13 on the opposite side of the piston and a chamber within which it is movable; a stem extending from the piston-valve through the slide-valve and movable loosely with relation thereto, said stem having a head which engages and moves the slide-valve after the first independent movement of the piston-valve, said slide-valve having a port 16 made in it; an independent valve 15 guided longitudinally on the valve 13 and movable by the stem to open the port 16; a port 17 made in the slide-valve and connecting with said port 16 said port 17 opened by the first movement of the said valve 15 and connections substantially as described between the port 17 and the air-brake cylinder.

7. The combination in an air-brake mechanism of a piston-valve movable in a chamber intermediate between the train air-pipe and the auxiliary reservoir, the slide-valve connected with and movable by said piston when train-pressure is reduced, ports opened by said movement to admit air to the brake-cylinder, a supplemental storage-reservoir connected with the passage through which the auxiliary reservoir is charged, a port in the slide-valve whereby communication with the storage-reservoir is opened simultaneously with communication between the train-pipe and the auxiliary reservoir and said storage-reservoir charged in unison therewith, said port being closed by all forward movement of the valve to retail the charge in the storage-reservoir and opened by the reverse movement so that the auxiliary reservoir may be quickly recharged from the storage-reservoir.

In witness whereof I have hereunto set my hand.

JAMES C. CLYDE.

Witnesses:
S. H. NOURSE,
JESSIE C. BRODIE.